United States Patent [19]
Jeney

[11] 3,775,932
[45] Dec. 4, 1973

[54] PACKAGING APPARATUS AND METHOD
[75] Inventor: Peter Jeney, Zug, Switzerland
[73] Assignee: Tourpac AG, Zug, Switzerland
[22] Filed: Mar. 1, 1972
[21] Appl. No.: 230,919

[30] Foreign Application Priority Data
Mar. 18, 1971 Switzerland.......................... 4017/71

[52] U.S. Cl.................. 53/22 A, 53/112 A, 53/184,
53/201, 425/388, 425/451
[51] Int. Cl............................................ B65b 31/02
[58] Field of Search................ 53/22 A, 112 A, 184,
53/201; 425/388

[56] References Cited
UNITED STATES PATENTS
3,343,332    9/1967   Mahaffy et al.................... 53/112 A
3,537,229   11/1970   Prena............................... 53/112 A Primary Examiner—Travis S. McGehee
Attorney—Axel A. Hofgren et al.

[57] ABSTRACT
Packaging apparatus and a method of packaging wherein a series of pocket members travel along an endless path through a plurality of stations with a packaging film held at a first station and formed under pressure into a pocket, at a subsequent station a product is placed into the film pocket, at a further station a second film is superimposed over the first packaging film and the two films are heat sealed together to form a plurality of sides of a package, and at a final station the partially-sealed package is enclosed within an airtight chamber with a vacuum drawn in the package through the open side thereof followed by heat sealing of the two films together to completely seal the package. The packaging apparatus and the packaging method permit simple modification for making packages of different widths from films of different widths by the use of insert members filling a part of the cavities in the pocket members to reduce the over-all size of the cavities and with hold-down structure at the pocket-forming station and heat seal structure at the initial sealing station adjustable to coact with the films of different widths to insure hold-down and sealing of the films. The structure of the final sealing station need not be modified since the airtight chamber may have a dimension equal to the largest package to be made and the vacuum drawing and final sealing always operates through the open side of the package which is along a fixed predetermined line which is the same regardless of the width of the packaging films and the resulting package.

13 Claims, 13 Drawing Figures

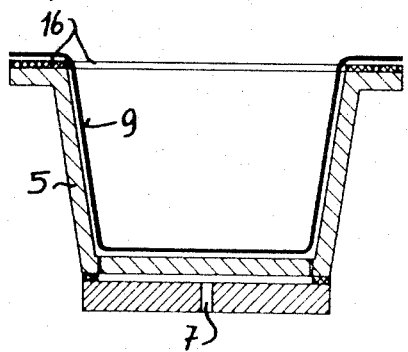
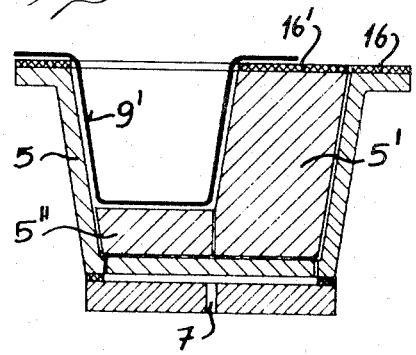
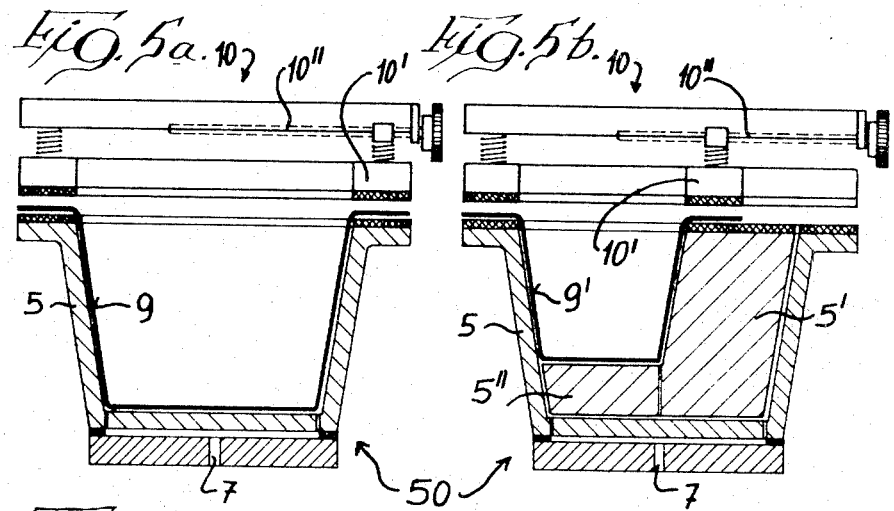
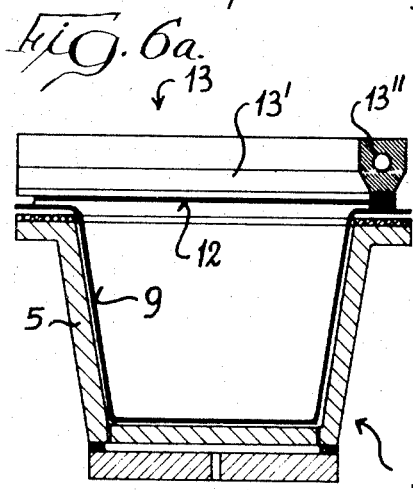
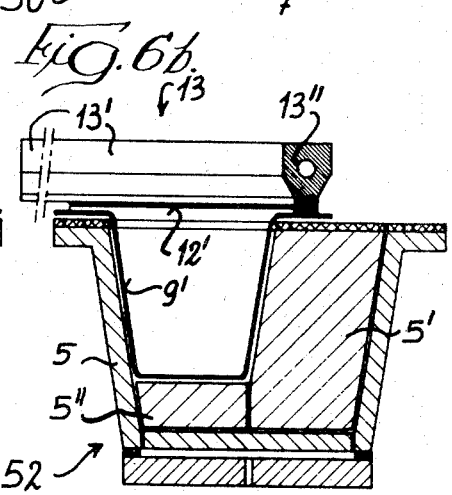

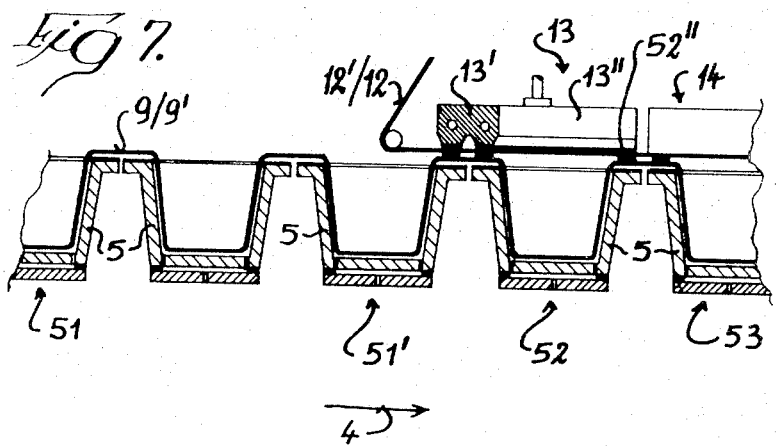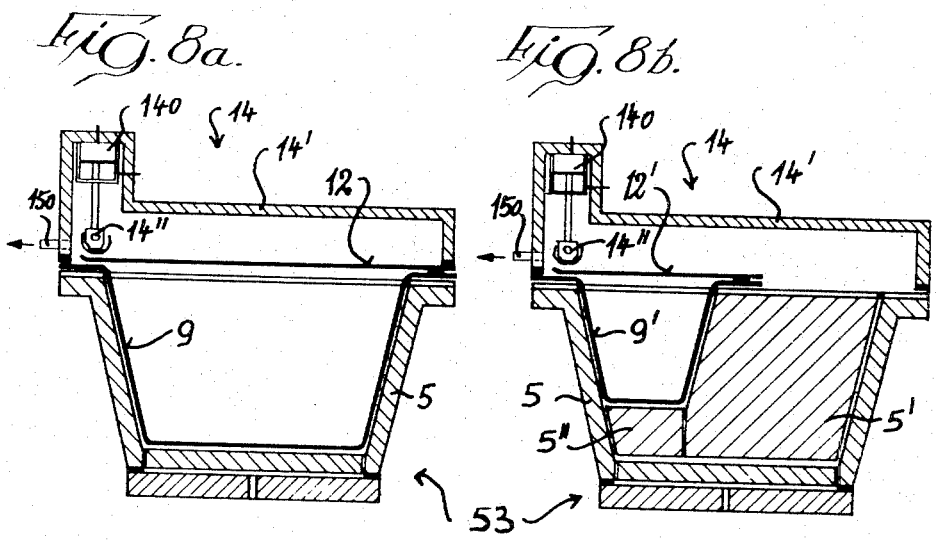

PACKAGING APPARATUS AND METHOD

BACKGROUND OF THE INVENTION

This invention pertains to packaging apparatus and packaging methods for making vacuum packages of a product by sealing of two superimposed films together with the product contained therebetweeen and within a preformed pocket in one of the films and with inexpensive, simple modifications being made to the basic machine to increase the flexibility of the apparatus to make packages of different widths from packaging films of a width only sufficiently wide for the package requirements and without any resulting wastage of packaging film.

Apparatus for making vacuum packages from superimposed packaging films and well known in the prior art. Generally, such machines are of substantial cost and can only be modified for making packages of varying widths with substantial changes in components of the machine. Such changes in existing machines require replacement of the substantial number of pocket members which travel along the line through the machine and also require replacement of the units at the station for forming a pocket in a packaging film and for vacuum drawing and sealing the package. The foregoing replacement problems resulted in a machine of substantial cost which had little versatility, thereby not being readily marketable to small and medium size packaging plants.

The problems in the prior art machines have been overcome by the invention disclosed herein by having an inexpensively constructed machine which has versatility in producing packages of varying sizes without any major component changes to the machine but with only the use of insert members placeable in the cavities of the pocket members which travel along an endless path through the stations of the machine and with means for varying the operative position of at least a part of the hold-down structure at the station for forming pockets in the first packaging film and for at least a part of the heated sealing bar structure at an initial sealing station for sealing parts of two superimposed packaging films together and without any adjustment at the final station where a vacuum is drawn in the package through an open side thereof followed by sealing of the open side.

SUMMARY OF THE INVENTION

A primary feature of this invention is to provide a new and improved packaging apparatus having an economical and, therefore, easily marketable construction for forming sealed vacuum packages and with simple inexpensive modifications and additions thereto to enable the apparatus to make packages of varying sizes from packaging films of varying widths.

An object of the invention is to provide an apparatus having the features set forth above and wherein the apparatus has a plurality of pocket members arranged for travel along an endless path through a series of stations and with each pocket member having a resilient strip around the top edge thereof surrounding a product receiving cavity, an insert member for selective placement within the cavity of the pocket member to fill up a portion of the cavity and result in a cavity of a lesser size to receive a smaller product and with the insert member having resilient material on the top thereof at the same level as said resilient strip, hold-down members at a first station coacting with the resilient strip to hold the film during the forming of a pocket therein in said cavity and heat seal bars at a preliminary sealing station to engage superimposed films against the resilient strip to form a plurality of sealed sides for the package, and at least one of the hold-down members and one of the heat seal bars being mounted for movement to an adjusted operative position to coact with the resilient material on the top of the insert members when a film of a lesser width is in use with said insert members.

Still another object of the invention is to provide a packaging apparatus as defined in the preceding paragraphs wherein all of the packaging films, regardless of the width thereof, have one edge guide along a fixed line through the stations of the apparatus with the result that the opposite edge of the films has various possible lines of travel depending on the over-all width of the films and wherein said one hold-down member and one sealing bar are those which extend along the path of travel of the pocket members and are adjustable along lines transverse to said paths of travel to be positioned in overlying relation to the variably positioned edge of the packaging films to come down into engagement with the film edge wherever it is positioned and engage the film or films against either the resilient strip of the pocket member or the resilient material on the top of the insert members, depending upon the preset condition of the machine.

A further object of the invention is to provide a final seal station wherein a sealing head is movable into engagement with the resilient strip of the pocket member to form an airtight chamber and with an edge of the film having the pockets formed therein engaged therebetween and with the superimposed film having its adjacent edge set back from the edge of the first film and in uncaptured relation with said head whereby the vacuum may be drawn through the opening between the films.

An additional object of the invention is to provide a packaging method performing the steps set forth above.

BRIEF DESCRIPTION OF THE DRAWINGS

FIG. 4a is a view taken generally along the line IV A — IV A of FIG. 3a;

FIG. 4b is a sectional view taken generally along the line IV B — IV B of FIG. 3b;

FIG. 5a is a transverse section of the coating structure at the first station for forming a pocket in a packaging film;

FIG. 5b is a view, similar to FIG. 5a, showing the same structure in operative position for coaction with a narrower packaging film;

FIG. 6a is a transverse section of the coacting structure at an initial sealing station looking toward the left in FIG. 1 and for operating with a wide packaging film;

FIG. 6b is a view, similar to FIG. 6a, showing the parts in operative position for coacting with a narrower packaging film;

FIG. 7 is a fragmentary vertical section taken lengthwise and centrally of the apparatus as shown in FIG. 1 and showing parts of the initial and final sealing stations;

FIG. 8a is a transverse section looking toward the left in FIG. 1 of the structure at the final sealing station for coacting with wide packaging films; and FIG. 8b is a view, similar to FIG. 8a, showing the structure in relation to narrower packaging films for a narrower package.

DESCRIPTION OF THE PREFERRED EMBODIMENT

Figure 1:
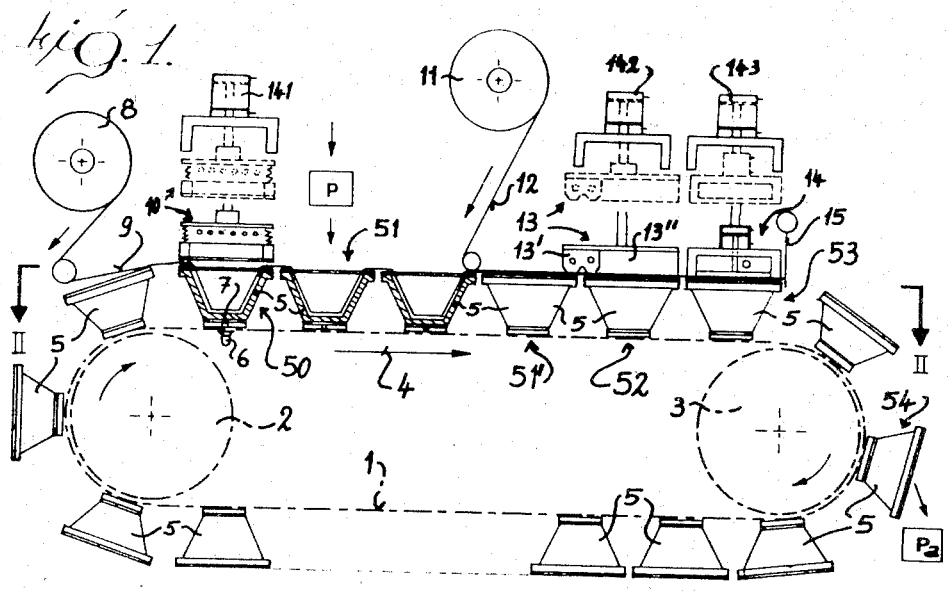
FIG. 1 is a front elevational view of the packaging apparatus with parts shown in section and with alternate positions of certain parts shown in broken lines.

In FIG. 1, conveyor belt means 1 shown in dot-dash line travels in an endless path and is guided about a pair of rotatable pulleys 2 and 3 and travels in the direction of the arrow 4. The conveyor belt means 1 carries a plurality of pocket members 5 which preferably are made of appropriate plastic material having the necessary thermal and mechanical properties and which may be formed in dies in order to be of a relatively inexpensive construction.

The pocket members 5 travel along an endless path through a series of stations with a pocket member 5 at a station 50 having a first packaging film superimposed thereover to have a vacuum applied into a cavity of the pocket member 5 through a vacuum conduit 6 which communicates with a bottom opening 7 in the pocket member. The first packaging film is supplied off a roll 8 with the film 9 being suitably guided into position over the pocket member 5 at the station 50. A clamping frame 10 is shown in elevated position in broken line and immediately above operative position in full line and it has a plurality of hold-down members forming a rectangular configuration to overlie a resilient strip 16 secured to the upper edge of the pocket member 5 surrounding the cavity in the pocket member. The clamping frame 10 normally has a heating system located therewithin to heat the first packaging film 9 to facilitate the forming of a pocket in the film by the application of vacuum through the bottom opening 7 of the pocket member.

Figure 2:
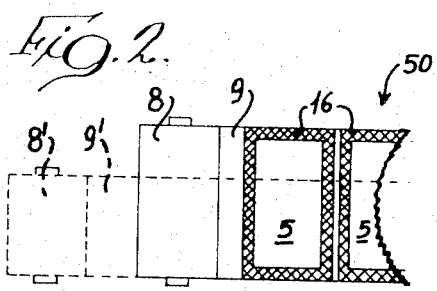
FIG. 2 is a partial plan section taken generally along the line II—II in FIG. 1 and with a wide packaging film shown in full line and a narrower packaging film shown in broken line.
Figure 3A:
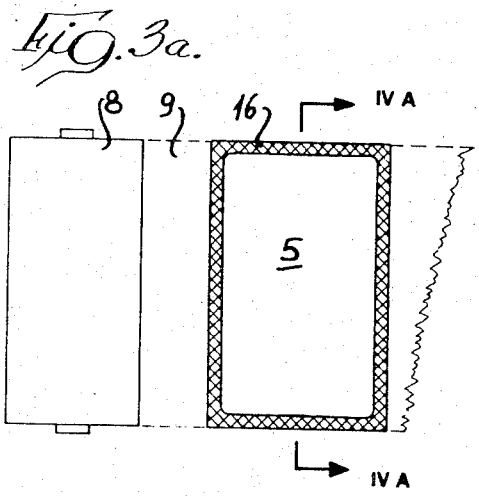
FIG. 3a is a view similar to FIG. 2 showing the use of a wide packaging film.
Figure 3B:
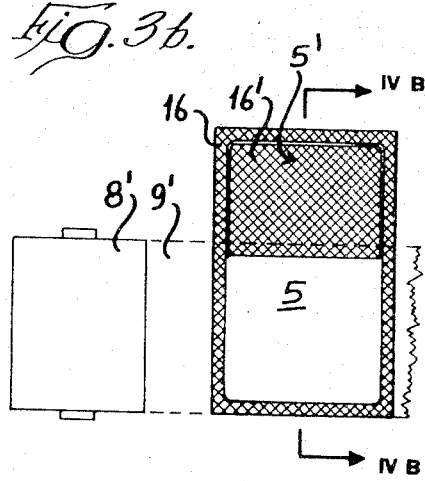
FIG. 3b is a view similar to FIG. 3a, but showing the use of a narrower packaging film.

One of the hold-down members 10' carried by the clamping frame 10 is adjustable to several different operative positions, as shown by comparing FIGS. 5a and 5b, by mounting on a rotatable threaded spindle 10''. As noted in FIGS. 5a and 5b, the film 9 or 9' has one edge at the left of each figure overlying the resilient strip 16 on a pocket member and this relation is the same regardless of the width of the packaging film. The relation shown in FIG. 5a is that for a film 9 having the width shown in FIG. 2. The relation shown in FIG. 5b is for a narrower packaging film 9' which, as shown in FIG. 2, is supplied from a narrower roll 8' of film. Regardless of the width of the packaging film, there is one edge of the film that is common, which travels along a common line through the apparatus, this being the lower edge in FIG. 2 and the left-hand edge as viewed in FIGS. 5a and 5b.

The apparatus has provision for making packages of various widths as will be apparent by comparison of FIGS. 5a and 5b, with the full cavity of the pocket member 5 being used as shown in FIG. 5a. When a smaller package is to be produced, a suitably-shaped insert member 5' is fitted into the basic cavity of the pocket member 5 as well as a bottom member 5''. Generally, the bottom insert 5'' can be integral with the insert member 5' as long as there is a passage for escape of air from the remaining cavity area through the bottom opening 7. The insert member 5' has an upper surface at the same level as the edges of the pocket member 5 and has resilient material 16' on the top surface at the same level as the resilient strip 16 to underlie an edge of the packaing film 9' as shown in FIGS. 4b and 5b. This structure results in modification of the basic pocket member to an effectively reduced size for making smaller packages by the use of narrower film rather than by using a constant width film and trimming off and wasting substantial film after completion of a package. One modification required for operating with different film widths in addition to selection and insertion of suitable insert members 5' and 5'' is the operative positioning of the hold-down member 10' which, as shown in FIG. 5a, overlies the resilient strip 16 while in FIG. 5b is shown, after operation of the threaded member 10', to overlie the edge of the film and a part of the resilient material 16' on the top of the insert member 5'. With the clamping frame fully depressed to engage the film against the pocket member and insert member if used, a vacuum is then applied through the bottom opening 7 and the film is drawn into the cavity to form a pocket in the film. The clamping frame is then elevated to the broken line position, as shown in FIG. 1, and the pcoket member 5 is indexed from the position shown in station 50 to station 51 wherein a product P is inserted into the film pocket with the pocket member then indexed to station 51' where a second film 12 is superimposed onto the first film by supply from a supply roller 11 and the pocket member 5 then indexes to initial sealing station 52. The initial sealing station has a vertically movable frame 13 with a double sealing bar 13' extending transversely to the path of the pocket members and which has a pair of heat seal bars which, as shown particularly in FIG. 7, coact with the leading edge of a pocket member 5 at station 51' and the trailing edge of a pocket member 5 at station 52 to engage the superimposed films against the resilient strips on the tops of the pocket members to form a pair of spaced-apart heat seal lines in the films. Additionally, a heat seal bar 13'' extends parallel to the path of travel of the pocket members 5 and makes a seal between the superimposed films along a side of the package. As a result, a package has its leading edge 52'' sealed at station 51' and its trailing edge and one side sealed at station 52 while a fourth side is left open.

The frame 13, in addition to being mounted for vertical movement, is moved for transverse movement whereby when an insert 5' is placed in the cavity of a pocket member and a narrower film is used, the entire frame may be shifted laterally to extend partly beyond the apparatus, as shown in FIG. 6b to have the heat seal bar 13'' overlie the superimposed films disposed above the resilient material 16' on the insert member.

Up to this point, it will be seen that the apparatus may simply make packages of various size from packaging films of various widths and only of the minimum width required solely by selection of appropriate insert members 5' and 5'' and the operative position of the hold-down member 10' and the initial sealing frame 13 for specific positioning of the heat seal bar 13''.

Following the sealing of three sides of the package at initial sealing station 52 and in part at station 51', the pocket member 5 is indexed to a vacuum draw and final seal station 53 having a vertically movable sealing head 14. Following the vacuum draw of the package and final sealing at station 53, a pocket member 5 is advanced and, at the next stop in the operating sequence, a knife 15 is operated to sever a complete package from the films 9 and 12. At a station 54, a package may be ejected, as shown at $P_a$ in FIG. 1.

The sealing head is shown particularly in FIGS. 8a and 8b and has an enclosing wall 14' with a lower perimetral edge coextensive with the resilient strip 16 of a pocket member 5 wherein the lowering of the sealing head 14 brings the lower edge thereof into sealing engagement with the resilient strip 16 to form an air-tight chamber. As will be noted, this relation is independent of the width of package and width of packaging films used, although if a full width package is being made it will be noted that at least parts of the film are captured between the sealing head and the resilient strip 16, as seen in FIG. 8a. Preferably, the left-hand edge of the upper film 12 or 12' is set back from the corresponding edge of the first packaging film 9 and 9' as viewed in FIGS. 8a and 8b whereby the edge of the first packaging film is captured between the sealing head and the resilient strip 16 with the edge of the superimposed film being free whereby drawing of a vacuum from within the package is facilitated and with there being a vacuum tube connection, shown at 150. Following drawing of the vacuum, the final heat seal bar 14" is lowered by operation of a motor, such as an oil or air cylinder 140 to press the two films together and against the resilient strip 16 of the pocket member 5 to seal the films together and complete the seal of the package. With this construction, there is no need for adjustment for operating on packages of varying sizes.

As stated previously, the clamping frame 10, the initial sealing head 13 and the sealing head 14 are all mounted for vertical movement and this movement may be under the control of a series of motors, such as air or hydraulic cylinders 141, 142 an 143, respectively, as shown in FIG. 1. With the structure disclosed herein it will be seen that a method of forming packages of varying width using packaging films of a minimum width requirement is provided. If a narrower film is used, the only requirements are that an insert 5' selected from a variety of different sizes be positioned in each of the cavities of the pocket members 5 and that corresponding adjustments be made for the clamping frame 10 and specifically and hold-down member 10' and for the heat sealing frame 13 at the initial heat sealing station 52. Alternative to the adjustment of the hold-down member 10' shown in FIGS. 5a and 5b, it is possible to have the hold-down member 10' mountable in one of a preselected number of positions and to have the heat sealing member 13" mounted independently of the remainder of the frame 13 whereby it may be adjusted to the desired operative position without the lateral adjustment of the entire frame 13.

I claim:

1. Packaging apparatus comprising, a series of pocket members mounted for movement along an endless path, a first station along said path having means thereat for forming a pocket in a first packaging film overlying a pocket member at said first station, a second station having means for sealing a second packaging film to said first packaging film around several sides of said formed pocket but leaving at least one side open, a third station having means thereat for drawing a vacuum from between said films and sealing said films together to form a completely sealed package, and means for modifying the effective size of the pocket members and the operative position of the means at the first and second stations to perform package forming steps on first and second packaging films of many different widths.

2. Packaging apparatus as defined in claim 1 wherein said pocket members are of plastic and each has a resilient strip extending around the top edge thereof, and said means for modifying the effective size of the pocket members includes an insert member for each pocket with resilient material on the top thereof positioned to underlie an edge of said first packaging film.

3. Packaging apparatus as defined in claim 2 wherein the means at the first and second stations includes a member at each of said stations and adjustably movable along a line extending transverse to the path of said pocket members to a modified operative position to overlie the resilient material on the top of the insert member or a part of the resilient strip on the top edge of the pocket member.

4. A packaging apparatus as defined in claim 2 wherein the means at the first station includes a plurality of hold-down members to hold the first packaging film against the resilient strip of a pocket member, and a vacuum connection to the pocket member, the means at the second station includes heated sealing bars overlying the resilient strip of a pocket member, one of said hold-down members and one of said heated sealing bars which each extend lengthwise at one side of said path being adjustably mounted on a line transverse to said path to overlie the resilient material on the top of the insert member, and the sealing means at the third station being positioned at the other side of said path to coact with all packages regardless of the width thereof.

5. A packaging apparatus as defined in claim 4 wherein said means at the third station includes a sealing head overlying the pocket member and movable into engagement with the resilient strip on the pocket member to form an airtight chamber with the vacuum drawing means communicating therewith.

6. A packaging apparatus as defined in claim 5 wherein the first packaging film extends beyond the second packaging film at said other side of the path and said sealing head engages the first packaging film but not the second packaging film at said third station to facilitate drawing a vacuum therebetween.

7. A packaging apparatus as defined in claim 2 wherein the means at the first station includes a plurality of hold-down members to hold the first packaging film against the resilient strip of a pocket member, one of said hold-down members along one side of said path being adjustably mounted, and said means for modifying the operative position at the first station includes manually operable structure for adjusting said one hold-down member.

8. Packaging apparatus comprising, a series of pocket members mounted for movement along an endless path, each of said pocket members having a cavity for receiving a first packaging film and a resilient strip extending around the top edge thereof to underlie the packaging film, and a plurality of insert members positionable one in each of the cavities of the pocket members to fill a part of the cavities and thereby reduce the size of the cavities and form a top surface which is at the level of the top edge of the pocket member, resilient material on said top surface to underlie an edge of a packaging film which is narrower than said first packaging film a first station with means coacting with the pocket member for making a pocket in the packaging film including hold-down members to engage the edges of the film against the resilient strip, and means mounting one of the hold-down members for movement to a different operative position when the pocket members have the insert members therein to have said one hold-down member engage the edge of a packaging film which is narrower against said resilient material of the insert member.

9. Packaging apparatus comprising, a series of pocket members mounted for movement along an endless path, each of said pocket members having a cavity for receiving a first packaging film and a resilient strip extending around the top edge thereof to underlie the packaging film, and a plurality of insert members positionable one in each of the cavities of the pocket members to fill a part of the cavities and thereby reduce the size of the cavities and form a top surface which is at the level of the top edge of the pocket member, resilient material on said top surface to underlie an edge of a packaging film which is narrower than said first packaging film, a station with heated sealing bars overlying the resilient strip of a pocket member to engage superimposed packaging films against the resilient strip for sealing the superimposed films together, and means mounting at least one of said heated sealing bars for movement to a different operative position when the pocket members have the insert members therein to have said one heated sealing bar overlie packaging films that are narrower and press the films against the resilient material of the insert member.

10. Packaging apparatus as defined in claim 8 wherein said pocket members and insert members are of plastic.

11. A packaging method for making packages of varying width comprising the steps of gripping the edges of a first film and forming a pocket in a first packaging film, placing a product in the pocket, superimposing a second packaging film on the first packaging film, sealing the superimposed films together to form three sides of the package including sealing along one edge of the films while leaving a fourth side open, drawing a vacuum within the package through the fourth side, sealing the films together at the fourth package side to complete the package, and, for a package of narrower width, using narrower packaging films locating one edge of the films along the same line as wider films and gripping the other edge of the first packaging film at a different operative location and engaging the other edges of the superimposed film at a different operative position to seal them together, the location of the vacuum draw of the package and sealing of the fourth package side remaining constant for all widths of packaging films.

12. Packaging apparatus comprising, a series of pocket members mounted for movement along an endless path, means for forming a pocket in a first packaging film overlying a pocket member, means for sealing a second packaging film to said first packaging film around several sides of said formed pocket but leaving at least one side open, means for drawing a vacuum from between said firms and sealing said films together to form a completely sealed package, and means for modifying the effective size of the pocket members and the operative position of the pocket forming means and the first-mentioned sealing means to perform package forming steps on first and second packaging films of many different widths.

13. Packaging apparatus comprising, a first station having means for forming a pocket in a first packaging film, a second station having means for sealing a second parkaging film to said first packaging film around several sides of the formed pocket in the first packaging film but leaving at least one side open, a third station having means for drawing a vacuum from between said films and sealing said films together to form a completely sealed package, said means at the first station including a pair of spaced support surfaces for the edges of the first packaging film and hold-down means for pressing said edges against the support surfaces, said means at the second station including a pair of support surfaces for the edges of the first packaging film and a movable member to press the second packaging film against an edge of the first packaging film, and means for forming packages from film of many different widths including means for positioning one of the first and second stations at a distance from the other support surface proportioned to the width of the first packaging film, while maintaining said other support surfaces along a constant line, means for variably positioning that part of the hold-down means that coacts with said one support surface at the first station, and means for variably positioning said movable member at the second station, and said means at the third station being in line with said constant line.

* * * * *